UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

QUINOLIN COMPOUNDS AND PROCESS OF PRODUCING THE SAME.

1,138,936. Specification of Letters Patent. Patented May 11, 1915.

No Drawing. Application filed February 21, 1913. Serial No. 750,024.

*To all whom it may concern:*

Be it known that I, ALEX B. DAVIS, a citizen of the United States, residing at Indianapolis, Marion county, and State of Indiana, have invented and discovered certain new and useful Improvements in Quinolin Compounds and Process of Producing the Same, of which the following is a specification.

My invention relates to compounds of the quinolin series and process of producing them. These compounds are useful as mobilizers for uric acid.

The compounds are all derived from (2)para-oxy-meta-methoxy-phenyl-quinolin-(4)carboxylic acid, and are produced by boiling together in absolute alcoholic solution, equimolecular proportions of an aromatic amin, pyruvic acid and vanillin (para-oxy-meta-methoxy-benzaldehyde). Thus from the toluidins and anisidins there are formed the corresponding substituted quinolin compounds on boiling them with equimolecular proportions of pyruvic acid and vanillin in absolute alcoholic solution, ortho, meta, and para anisidin, and ortho, meta, and para toluidin yield respectively: (2)para-oxy-meta-methoxy-phenyl(8)methoxy-quinolin(4) carboxylic acid. (2) para-oxy-meta-methoxy-phenyl(7)methoxy-quinolin(4)carboxylic acid. (2)para-oxy-meta-methoxy-phenyl(6)methoxy-quinolin(4) carboxylic acid. (2)para-oxy-meta-methoxy-phenyl(8)methyl-quinolin(4)carboxylic acid. (2) para-oxy-meta-methoxy-phenyl (7) methyl-quinolin (4) carboxylic acid. (2) paraoxy-meta-methoxy-phenyl (6) methyl-quinolin (4) carboxylic acid. These com-pounds may be represented by the following formula:

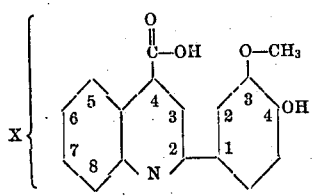

in which X is an organic radical replacing a hydrogen atom in one of the CH groups of the quinolin ring.

The last named compound of the group of six compounds above given may be represented by the formula:—

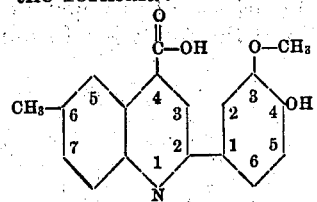

If para-amino-ethyl-benzoate be the amin used, then the product is (2)para-oxy-methoxy-phenyl-quinolin(4)(6)dicarboxylicacid-(6)ethyl-ester.

In carrying out the process in detail, one may proceed as follows: In a vessel provided with a reflux condenser, there is placed 76 parts by weight of vanillin, 180 parts of absolute alcohol, and 54 parts of para-toluidin. It is then heated to boiling and allowed to boil 15 minutes. 44 parts of pyruvic acid diluted with its own volume of absolute alcohol, are then allowed to slowly flow in over a period of ½ hour, and the resulting mass boiled three hours. It is then set aside for twenty-four hours, when the quinolin compound crystallizes out. It is filtered off and recrystallized from alcohol, when it appears as very fine deep orange colored crystals. The compound produced as above will be (2) para-oxy-meta-methoxy-o-phenyl(6)-methyl-quinolin (4) carboxylic acid.

The method of purification may vary somewhat from the above according to the properties of the particular compound produced.

I claim—

1. Compounds of the quinolin (4) carboxylic acid group, containing a para-oxy-meta-methoxy-phenyl group in the 2 position in the quinolin ring.

2. Compounds of quinolin having the following formula:

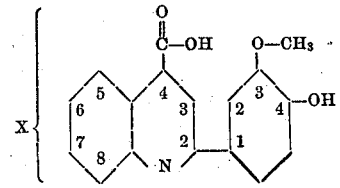

in which X is an organic radical replacing a hydrogen atom in one of the CH groups of the quinolin ring.

3. A quinolin compound having the following formula:

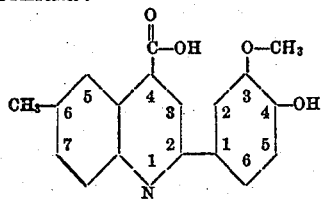

which may be called (2) para-oxy-meta-methoxy-phenyl (6) methyl-quinolin (4) carboxylic acid.

4. The process of producing compounds of quinolin of the following formula:

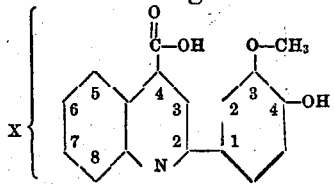

in which X is an organic radical replacing a hydrogen atom in one of the CH groups of the quinolin ring, by boiling together in absolute alcoholic solution pyruvic acid, vanillin and aromatic amin.

5. The process of producing (2) para-oxy-meta - methoxy - phenyl (6) methyl - quinolin- (4) carboxylic acid by boiling together in absolute alcoholic solution, pyruvic acid, para toluidin and vanillin as above described.

In witness whereof, I have hereunto set my hand and seal at Indianapolis, Indiana, this third day of February, A. D. nineteen hundred and thirteen.

ALEX B. DAVIS. [L. S.]

Witnesses:
  C. W. SHOWALTER,
  FRANK R. ELDRED.